J. P. DAVENPORT.
POTATO PLANTER.
APPLICATION FILED MAR. 18, 1915.
1,230,465.
Patented June 19, 1917.
4 SHEETS—SHEET 4.
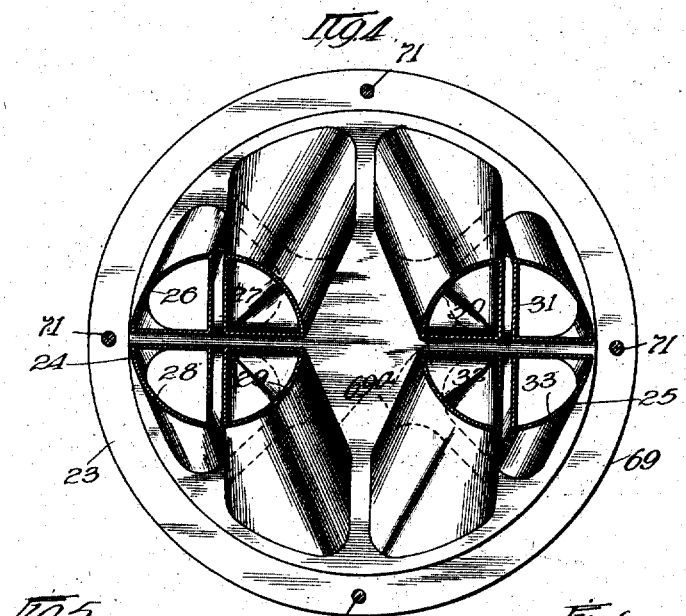
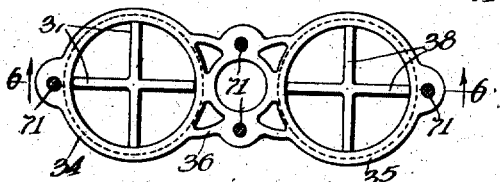
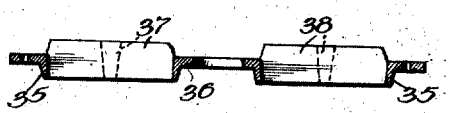
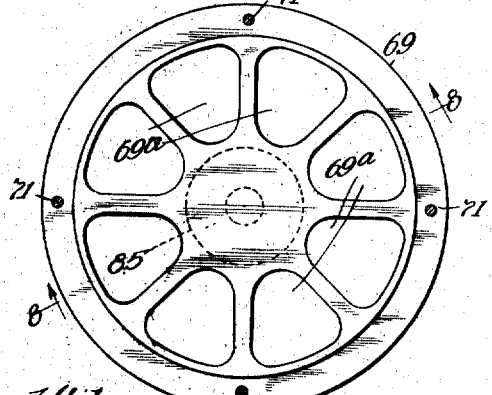
Witnesses
Inventor
Joseph P Davenport
By Jno. S Elliott
atty.

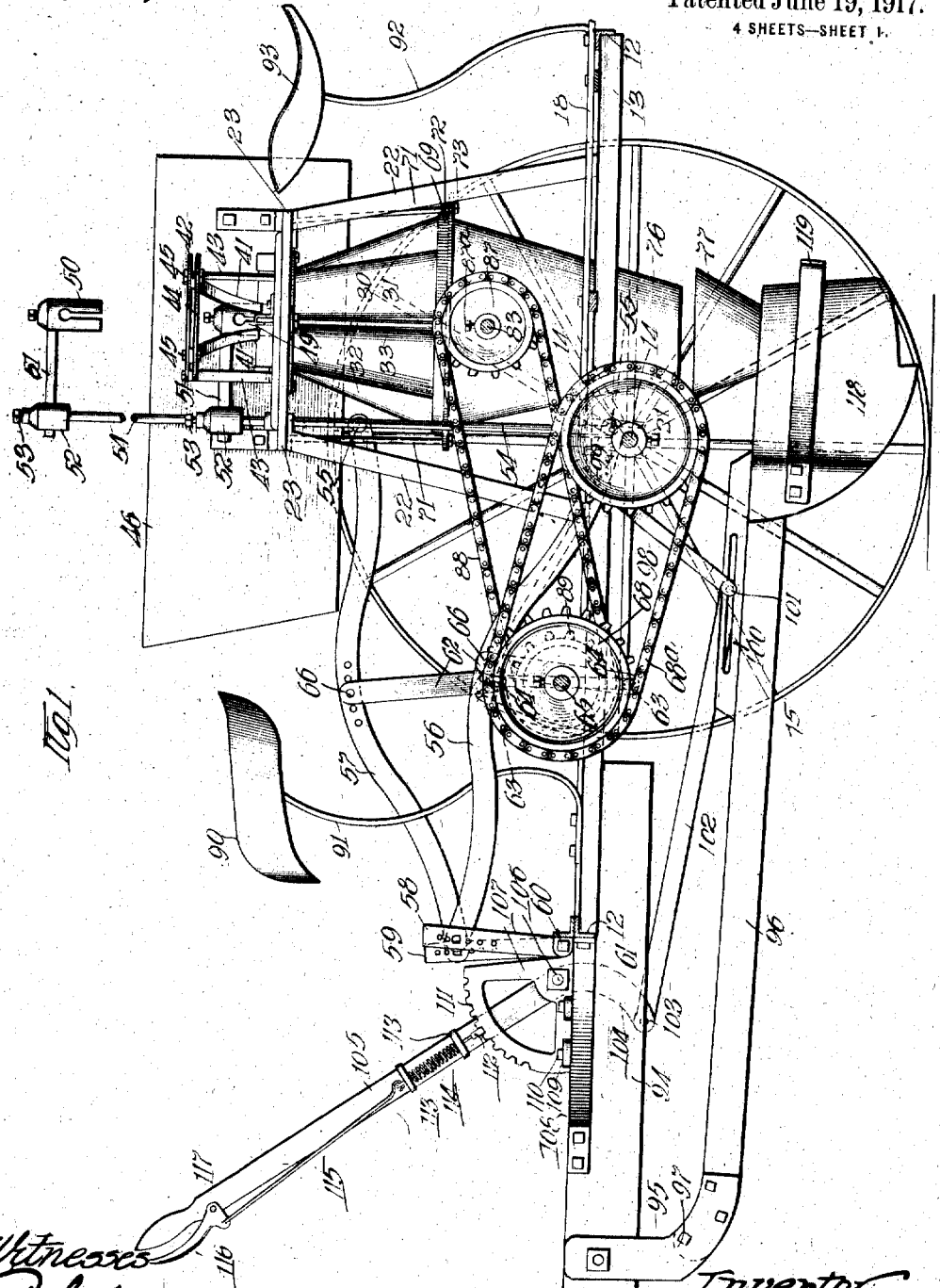

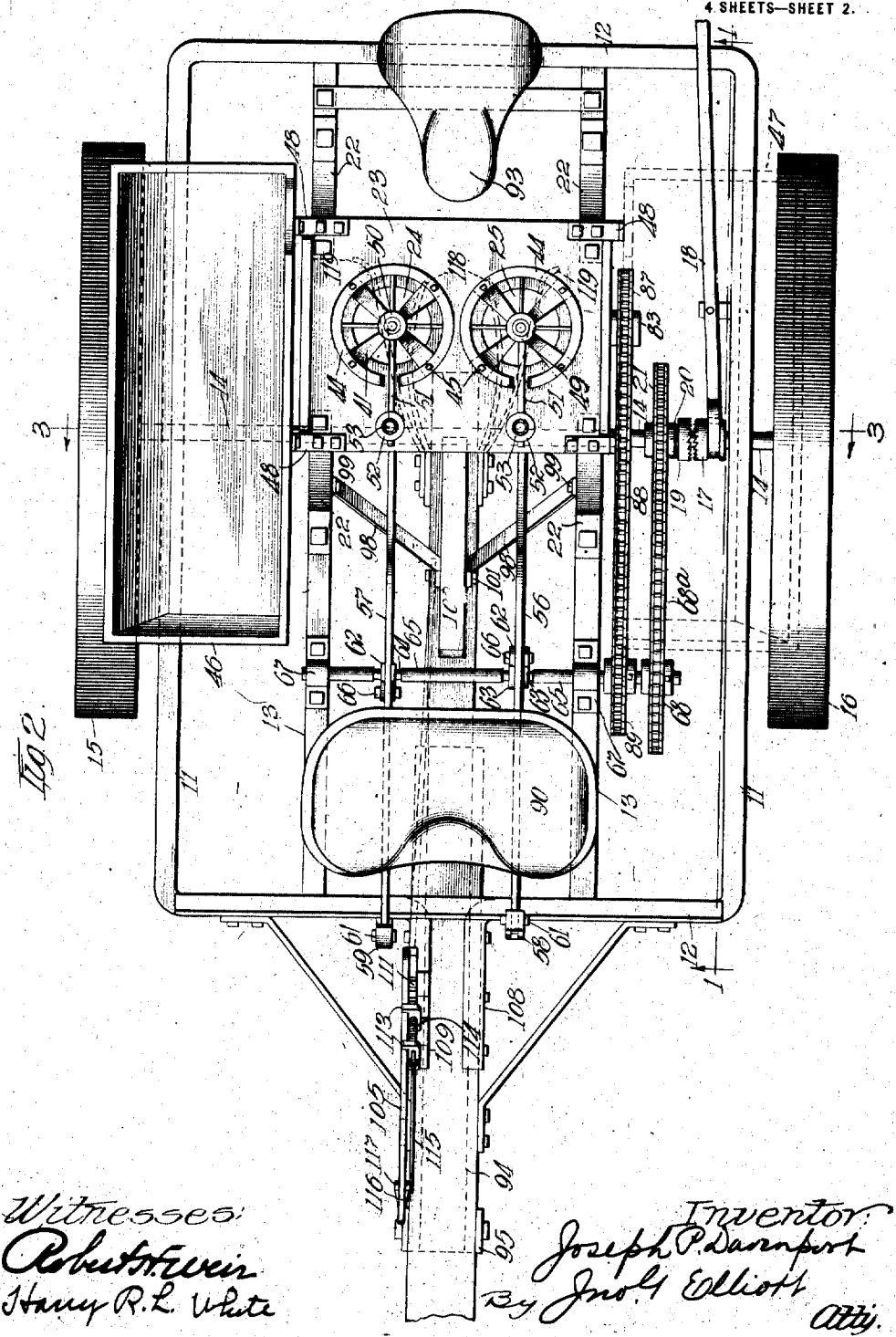

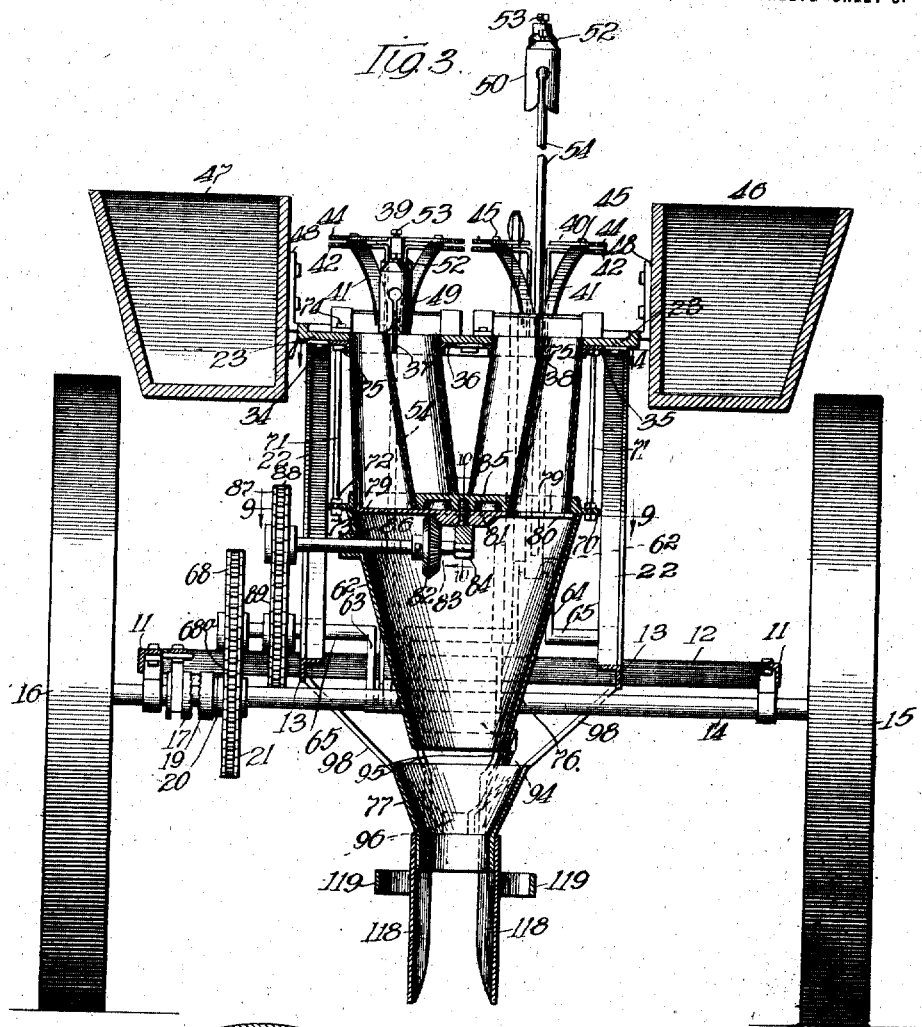
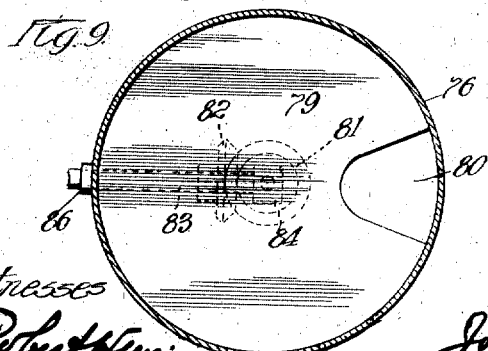
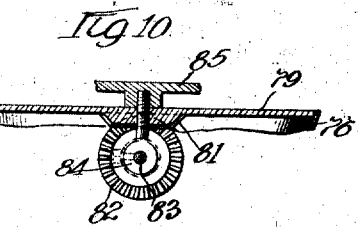

UNITED STATES PATENT OFFICE.

JOSEPH P. DAVENPORT, OF WHEATON, ILLINOIS.

POTATO-PLANTER.

1,230,465.  Specification of Letters Patent.  Patented June 19, 1917.

Application filed March 18, 1915. Serial No. 15,191.

*To all whom it may concern:*

Be it known that I, JOSEPH P. DAVENPORT, a citizen of the United States, and resident of Wheaton, in the county of Dupage and State of Illinois, have invented certain new and useful Improvements in Potato-Planters, of which the following is a full, clear, and exact specification.

This invention relates to improvements in potato planters in which heretofore two oppositely arranged hoppers are revolved about a common axis for alternately registering them with a single pair of intersecting cutting blades for each hopper for severing a potato with eyes into quarters falling by gravity from the blades into individual chutes common to both hoppers and to a position of rest on a rotating valve provided with a single slot through which the several quarters successively pass, and thence conducted into a furrow formed by the machine, the whole potatoes being forced from the hoppers against and past the cutters by means of a single reciprocating plunger.

With a potato planter constructed as above described, all of the quarters of each potato must be discharged from the valve before any of the quarters of the next potato have fallen from the cutters to a position of rest thereon, and at best there can never be at rest on the valve more than one quarter of a potato, and as may be only during the time occupied by the falling of the quarters of the succeeding potato from the cutters through the chute to the valve.

In practice it is found that the potato quarters are not infrequently suspended by their skins from its cutter blades, and that although this is but momentary, the rotation of the disk is necessarily so rapid that its slot will pass out of register with the hung quarter while it is descending through its chute, and as a result of which the quarter must remain at rest on the valve until it is again in register with the slot, while in the meantime the corresponding cut quarter of the next potato has fallen to a position of rest thereon, with the result that not only are the two quarters planted together, but that there is a double space between them and the preceding planted quarter of the first potato, and as a result of which the operation of the machine is not only uncertain, but objectionable.

Moreover, the mechanism necessary for revolving the hoppers to alternately register both of them with a single pair of cutting blades, and for at the same time actuating the valve, is necessarily more or less complex and accordingly objectionable because of the difficulty of adjustment, its liability to get out of order, lack of durability, and because of the expensiveness of its construction.

Owing to the rapidity with which the hoppers must be revolved and suddenly stopped for registering them with a single pair of cutters, the use of stop mechanism and cushioning springs is required, increasing their otherwise complexity and cost of construction, and liability to get out of order.

The prime object of my invention is a potato planter provided with means for maintaining at rest in the machine a plurality, and preferably three cut potato quarters during and throughout the successive preceding discharge of other cut potato quarters therefrom.

More specifically stated the prime object of my invention is a potato planting machine, having a slotted rotating valve provided with separate surfaces of support individual to the cut quarters of two potatoes, and with means whereby a plurality, and preferably at least three cut quarters of one of two potatoes are always at rest thereon, during the successive discharge of other cut quarters therefrom, and whereby there is a substantial interval of time between the rest of a potato quarter thereon, and its discharge therefrom, with the result that when a potato is momentarily hung by the skin from its cutter, it may have time to fall by gravity to the valve at the instant, or before the valve slot is in register therewith.

A further, and important object of my invention is to provide a potato planter with means whereby it is possible and practical to accurately time the movement of the rotating valve with the reciprocating plunger thereof, and thereafter maintain them so timed as to insure the uniform spacing apart of the planted potatoes discharged therefrom.

Another object of my invention is to substantially and materially reduce the cost and number of parts of a potato planter, the complexity of its parts, the cost of its construction as a whole, and at the same time to increase its durability and certainty of operation under all conditions to be met with in the planting of potatoes.

With these ends in view, my invention finds embodiment in certain features of novelty in the construction, combination and arrangement of parts by which the said objects and certain other other objects are attained, all as hereinafter fully described with reference to the accompanying drawings, and more particularly pointed out in the claims.

In said drawings:

Figure 1 illustrates in side elevation, partly in section taken on the line 1—1 of Fig. 2 a potato planter in which my invention finds embodiment.

Fig. 2 is a top plan view of the same.

Fig. 3 is a vertical transverse section of the same, taken on the line 3—3 of Fig. 2.

Fig. 4 is an enlarged detail section on the line 4—4 of Fig. 3.

Fig. 5 is a bottom plan view of the cutters and their support.

Fig. 6 is a section taken on the line 6—6 of Fig. 5.

Fig. 7 is a plan view of the spider wheel or plate into which the several chutes project and are secured.

Fig. 8 is a section taken on the line 8—8 of Fig. 7.

Fig. 9 is a detail section taken on the line 9—9 of Fig. 3 showing the slotted valve in plan view, and in dotted lines the gearing by which it is rotated, and—

Fig. 10 is a transverse section on the line 10—10 of Fig. 3.

Similar characters of reference indicate the same parts in the several figures of the drawing.

The main frame of the potato planter consists of side bars 11—11 and end bars 12—12, and inner longitudinal bars 13—13 spaced from each other and from the adjacent side bars 11.

The side bars 11—11 are provided with suitable bearings for the adjacent ends of an axle 14, to the oppositely projecting ends of which are secured ground wheels 15 and 16, the frame and the various devices supported by it being substantially balanced on the axle, on which, near the wheel 16 is a clutch consisting of sliding member 17, operated by a hand lever 18, and a rotating member 19 fixed to the hub 20 of the main or driving sprocket wheel 21.

Rising from and supported by the longitudinal bars 13—13 are posts 22, of which there are four, at equal distances apart at their base, with the opposing posts at opposite sides of the machine converging toward each other, as shown in Fig. 1, and which at their upper ends provide a support for a plate 23 provided with two openings 24, 25 diametrically opposite each other. Between the walls of the opening 24 are confined the open ends of chutes 26, 27, 28 and 29, and likewise between the walls of the opening 25, chutes 30, 31, 32 and 33, the ends of each of which several chutes are triangular in cross-section, but slightly curved at their outer side to closely fit the walls of the openings 24 and 25 respectively in the plate.

Secured to the underside of the plate 23 is a pair of rings 34 and 35, which as shown in Fig. 5 are connected together as indicated at 36, and for this purpose preferably cast in one piece, to form cutter holders in each of which is respectively secured intersecting cutting blades 37—37 and 38—38 for severing potatoes with eyes into quarters, the openings between which blades register with the opposing chutes in the plate 23 directly beneath the cutting blade so that each cut potato quarter falls by gravity from between the blades into an individual chute therefor.

Suspended above the cutting blades are two hoppers 39 and 40, one for each pair of intersecting blades, each of which hoppers consists of a number of converging resilient tongues 41, the upper ends of which are bent to rest upon a ring 42, supported from the plate 23 by posts 43 between which ring 42 and a ring 44 the ends of the tongues 41 are clamped and held by means of nut bolts 45.

As a means for conveniently supplying the hoppers with whole potatoes two bins 46 and 47 are supported by means of angle iron 48—48, at opposite sides of the machine within convenient reach of the hoppers, and from which whole potatoes are alternately supplied to the hoppers.

The spring tongues 41 of the hopper are stiff enough to support the weight of a potato, cut sufficiently yielding to permit the potatoes to be pushed through the hopper against and past the cutting blades by means of plungers 49 and 50, respectively, for each hopper, each of which is secured to the end of a bar 51, adjustable in a block 52 by means of a set-screw 53 for centering the plungers with their hoppers and on a line through the intersection of the cutters, the blocks 52 in turn being supported on the upper ends of a shaft 54, which shafts, see Fig. 1, pass through and have their bearing in the plate 23, and are pivoted at their lower ends at 55 respectively to rocker arms 56 and 57, the forward ends of which rocket arms are in turn pivoted to upright links 58 and 59, each of which are supported by a pivot bolt 60 in a suitable bearing 61, mounted upon the frame of the machine.

The rocker arms 56 and 57, are respectively connected by links 62, with crank arms 63 and 64, on a shaft 65 by means of pins 66, which shaft is journaled at its opposite ends in bearings 67—67 mounted on the bars 13—13 of the frame, the shaft being provided at one end with a sprocket gear 68 driven by the sprocket chain 68ª from the sprocket 21.

The crank arms 63 and 64 are diametrically opposite each other on the shaft 65, and as a result of which when one of the plungers is at the limit of its up stroke, the other plunger will be at the limit of its down stroke, so that when one plunger is pushing a potato out of the hopper against and past the cutters, the other plunger is elevated sufficiently above its hopper for the introduction therein of a whole potato with eyes therein.

In this connection it is now observed that owing to the pivotal support of the rocker arms 56 and 57 by their respective pivoted links 58, 59 and 62, the shafts 54 and their respective plungers 49 and 50 are reciprocated in a vertical line notwithstanding the vibrating movement of the rocker arms.

All of the several chutes 26 to 33 inclusive are confined within and supported by a ring 69, which is in the form of a spider wheel, see Fig. 7, and thereby providing a separate opening 69ª therethrough for each of the several spouts wedged or otherwise held therein, provided with a flange 70 in which are secured rods 71 by means of opposing nuts 72—73 passing through and suspended from the plate 23, by means of nuts 74—75 which several chutes discharge the potato quarters passing therethrough into single-discharge spout 76 converging toward the lower end, and suspended by any suitable means from the ring 69, the quartered potatoes from the spout in turn discharging into a suspended funnel 77, from which funnel the potatoes fall by gravity into a furrow made by the machine, as hereinafter described.

Between the upper end of the spout 76, however, and the lower ends of the several spouts is a disk valve 79 provided with a single slot 80, which on the rotation of the valve successively registers, see Fig. 7, with the open ends of the several spouts 26 to 33 inclusive.

Cast with, or otherwise rigidly secured to the underside of the disk valve 79 is a bevel gear wheel 81 below and meshing with which is another gear wheel 82 on a shaft 83, one end bearing of which shaft is in a bracket 84 passing through the gear, the disk valve, and a lug 85 projecting axially from the slotted ring 69, and into which several parts the bracket 84 is screw-threaded.

The end of the shaft 83 is, see Fig. 3, reduced adjacent its bearing in the brackets 84 to prevent end thrust, the shaft being provided with another bearing formed, see Figs. 3 and 9, by a lug 86 secured to and projecting from the chute 76.

The disk is revolved by means of a sprocket wheel 87 adjustably secured by a set-screw 87ª on the outer end of the shaft 83 by means of a sprocket chain 88, see Figs. 2 and 3, passing over another sprocket wheel 89 on the shaft 65, and whereby the valve and the plungers are both operated from a single and the same shaft, due regard being had as to their relative size and number of teeth for timing the movements of the valve and the plunger.

In other words the movement of the plungers and valve is so timed that there shall be confined in their individual chutes resting upon the disk valve, a plurality of potato quarters, and preferably three, throughout the successive discharge of the other quarters thereon, through the slot of the valve into the spout in order that any quarter hanging by its skin from the cutters may have sufficient time to release itself and fall by gravity to the valve when or before the valve is in register therewith, and as it is found to do in practice.

Supported from the frame of the machine by means of a flexible post 90 for the driver's seat 91, and likewise from the rear end of the frame, is a flexible curved post 92 supporting a seat 93 seating an attendant in position for delivering the potatoes from the receptacle 46 and 47 alternately to the two hoppers when their respective plungers are sufficiently elevated for that purpose, the frame being also provided with a tongue 94 to which is secured a depending U-shaped bracket 95 from which is suspended one end of a beam 96 by means of a pivot bolt 97.

The beam 96 is also suspended toward its opposite and rear end by means of links 98—98 pivoted to the bars 13—13 of the frame, by means of bolts 99, which converge downwardly in a forward direction, and are pivoted at their lower ends to a slotted lug 100 by means of a bolt 101 passing therethrough and through the ends of opposing links, which bolt 101 has pivoted thereon one end of a forwardly projecting link 102, suspended by a pivot 103 from the bent end 104 of a lever 105, fulcrumed on a bolt 106 passing through a triangular plate 107 secured to a bracket 108 for the tongue 94 by means of lugs 109 and screw-bolts 110.

The triangular plate 107 is provided with a segmental rack 111 adapted to be engaged by a detent 112 slidable in lugs 113—113 and normally projected by a coil spring 114, the detent being actuated by means of a rod 115 attached thereto at one end and at its opposite end to a hand grasp 116 secured toward the outer end of the lever by means of a pivot 117.

It is at the end of the beam 96 that the funnel 77 is supported and from which is suspended a plow 118, of the usual construction, for forming a furrow in advance of the dropping of the potato quarters from the machine therein and to which is secured the usual furrow covering device 119.

The hand lever 105 is in convenient reach of the drive for lowering and raising the beam to adjust the plow for increasing and diminishing the depth of the furrow desired, and also for raising the plow above its operative position, free and clear of the ground when transporting the planter.

In the operation of the machine during its forward movement there is but one potato at a time in each hopper, supplied by the attendant from the potato receptacles adjacent the hoppers, and which he introduces when there is sufficient space between a hopper and its plunger for introducing potatoes therein, and preferably for safety to his hands when a plunger is at the limit of its up-stroke.

When the movement of the valve and of the plungers is timed, as should be, in the structure herein shown and described, there are always three cut quarters of potatoes in a position of rest on the valve, with the result that if any of the potato quarters have been temporarily hung by their skins from its cutters, there is sufficient time for it to release itself and descend by gravity to a position of rest on the valve before the slot in the valve can move to register therewith, and whereby the possibility of the corresponding cut quarter of the next potato falling thereon is prevented, and the spacing of every planted quarter is provided for and insured.

In other words when any severed quarter clings to its cutter after the other quarters of the same potato have passed through the chute to a position of rest, the time required for the discharge from the valve of the three quarter pieces of the preceding potato is of sufficient length for the clinging quarter to release itself and pass to a position of rest on the valve before it can possibly reach the discharge opening of the valve.

Inasmuch as the valve is rotatably driven and the plungers reciprocated from one and the same drive shaft, it is apparent that when their respective gears on the power shaft 14, and on the drive shaft 65 are once properly timed, there will ever be at least three potato-quarters at rest on the valve when the machine is moving forward either fast or slow, and because of this positive connection to a single drive shaft of the reciprocating plungers and the rotating valve when there is employed an individual chute for every quarter of two potatoes, the outlet for which is controlled by a valve successively registering therewith.

In short, my invention provides for a potato planting machine in which potatoes with eyes are alternately cut into quarters and provided with means by which, for the first time, it is practical and possible to prevent planting two quarters together, and insure every quarter being planted singly at equal distances apart.

Having described my invention, what I claim and desire to secure by Letters Patent is:

1. A potato planter comprising in combination a plurality of fixed hoppers, a cutter for each hopper adapted for severing in quarters potatoes supplied thereto, a separate chute for the severed quarters of both cutters, and a rotating valve adapted for simultaneously supporting severed quarters from both cutters.

2. A potato planter comprising in combination a plurality of hoppers, a cutter for each hopper adapted for severing in quarters potatoes supplied thereto, a separate chute for the severed quarters of both cutters, and a single discharge spout for and common to all of said chutes.

3. A potato planter comprising in combination a plurality of fixed hoppers, a cutter for each hopper adapted for severing in quarters potatoes supplied thereto, reciprocating plungers for alternately pushing potatoes past said cutters, a separate chute for the severed quarters of both cutters, and a discharge spout for and common to all of said chutes.

4. A potato planter comprising in combination a plurality of fixed hoppers, means for severing in quarters potatoes respectively supplied to said hoppers, an individual chute for each severed potato quarter, a discharge spout for and common to all of said chutes, a movable support between said chutes and spout provided with a single opening through which the potato quarters in said chutes are successively discharged into said spout.

5. A potato planter comprising in combination a plurality of fixed hoppers, a cutter for each hopper, means for pushing potatoes alternately past said cutters, a separate chute for every severed piece of potato, a discharge spout for and common to all of said chutes, and a rotating disk valve located between said chutes and spout for and adapted to successively discharge a piece of potato from each chute into the spout.

6. A potato planter comprising in combination a plurality of fixed hoppers, cutters for each hopper, a valve adapted to simultaneously support the cut pieces of a plurality of potatoes delivered thereon from the cutters, and means for rotating said valve whereby all of said cut potato pieces are successively discharged from said valve.

7. A potato planter comprising in combination a plurality of hoppers, a cutter device and a plunger for each hopper, a valve adapted for simultaneously supporting pieces of potatoes from said cutter and capable of movement to discharge said pieces successively, a drive shaft for actuating the plungers, and a positive gear between said shaft and the valve.

8. A potato planter comprising in combination a pair of fixed hoppers, intersecting blades for each hopper, a number of chutes for each cutter individually receiving the cut pieces of potato therefrom, a rotating disk valve adapted to receive and simultaneously support cut pieces of potato from both sets of cutters, provided with a slot successively discharging said pieces therethrough, a crank shaft, a link and rocker arm connection between and for reciprocating said plungers, and a gear mechanism positively connecting said shaft with and rotating said valve.

9. A potato planter comprising in combination two plungers, a reciprocating shaft for each plunger, a drive shaft therefor provided with cranks, a connecting means between said crank arms and plungers for alternately reciprocating the latter, a hopper for and opposed to each of said plungers, a cutting mechanism opposed to each hopper, a set of chutes for and individually receiving the cut pieces from each cutter, a rotating valve adapted for simultaneously supporting cut pieces of potatoes from both cutters, and provided with a single slot through which the pieces are successively discharged, and a positive gear connection between said valve and the crank drive shaft.

In witness whereof, I have hereunto set my hand and affixed my seal, this 26th day of February, A. D. 1915.

JOSEPH P. DAVENPORT. [L. S.]

Witnesses:
  MILDRED ELSNER,
  JNO. G. ELLIOTT.